March 3, 1964  L. A. ELLISON  3,123,411
LINK FOR CRAWLER TYPE TRACTOR TREAD
Filed April 2, 1962  3 Sheets-Sheet 1

INVENTOR.
Luther A. Ellison
BY John A. Hamilton
Attorney.

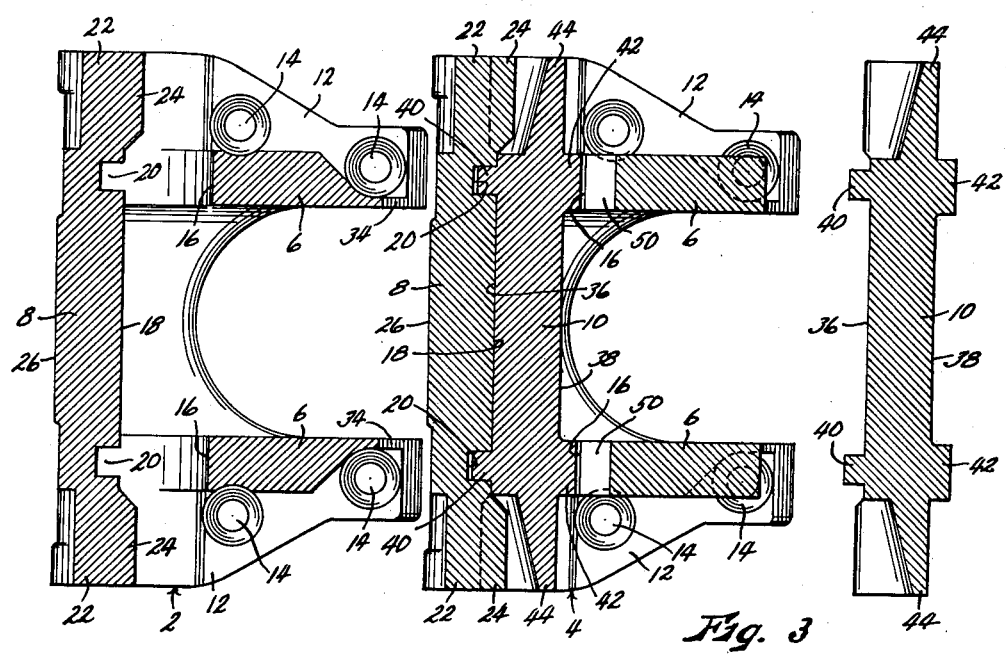
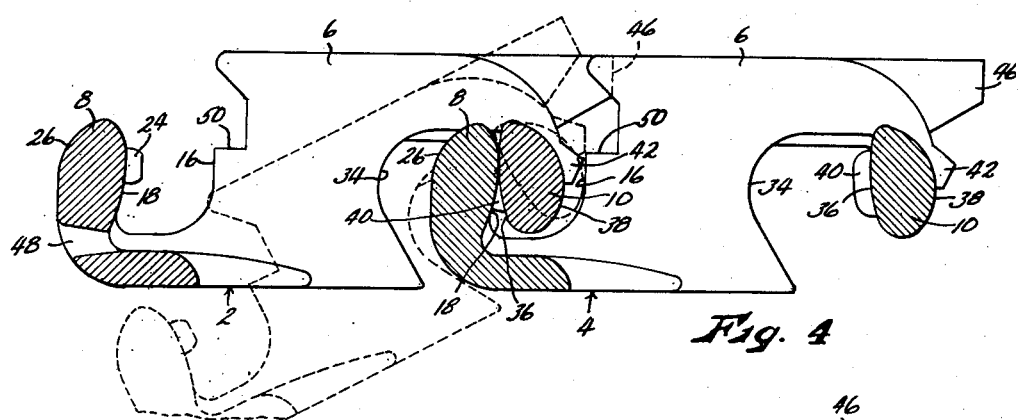
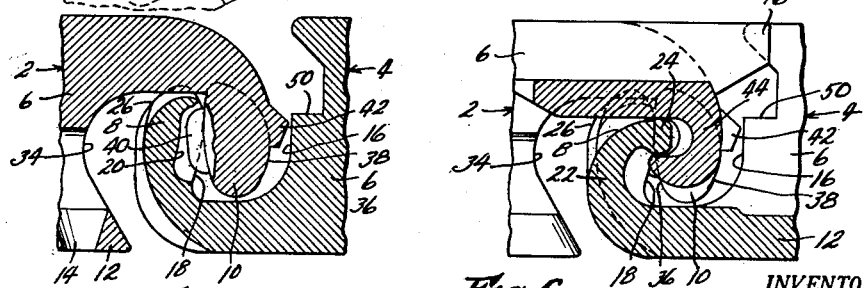
INVENTOR.
Luther A. Ellison
BY John A. Hamilton
Attorney.

March 3, 1964 L. A. ELLISON 3,123,411
LINK FOR CRAWLER TYPE TRACTOR TREAD
Filed April 2, 1962 3 Sheets-Sheet 3
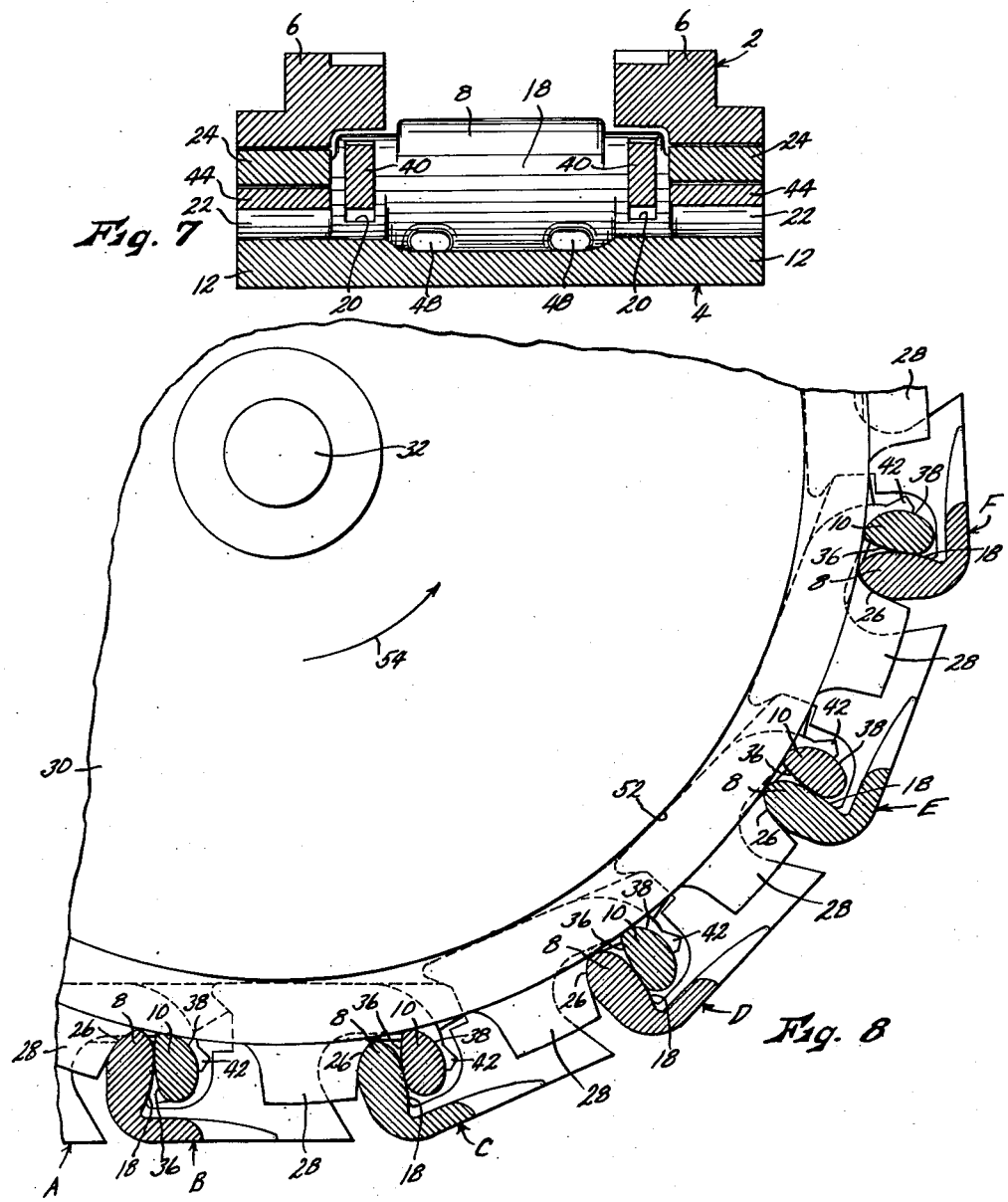
INVENTOR.
Luther A. Ellison
BY John A. Hamilton
Attorney.

United States Patent Office 3,123,411
Patented Mar. 3, 1964

3,123,411
LINK FOR CRAWLER TYPE TRACTOR TREAD
Luther A. Ellison, 2627 Buchanan St., Topeka, Kans.
Filed Apr. 2, 1962, Ser. No. 184,047
4 Claims. (Cl. 305—50)

This invention relates to new and useful improvements in treads for crawler track type tractors, and relates particularly to an improved link for such treads.

An important object of the present invention is the provision of a one-piece, unitary tread link so shaped as to be interengaged in series with other identical links to form an endless tread chain or loop.

Another object is the provision of a tread link of the character described which may be pivotally interengaged with other like links without the use of hinge pins, pintles or other wearing parts, but in such a manner that adjacent links have substantially only rolling line contact with each other, whereby wear is reduced and the necessity for lubrication is eliminated.

A further object is the provision of a tread link which when associated with other like links in an endless tread trained over the idler and drive wheels of a tractor has substantially no movement relative to said wheels in normal operation, particularly no pivotal movement relative thereto as the link is pivoted relative to the flat reaches of the tread as said link engages said wheels. This eliminates another source of friction and wear.

A still further object is the provision of a tread link of the character described which is firmly interlocked with adjacent links in all normal operating positions thereof, but which may be readily detached from either adjacent link by introducing slack in the tread and pivoting said links relatively in a direction opposite to the direction in which they pivot in normal operation.

Figure 1:
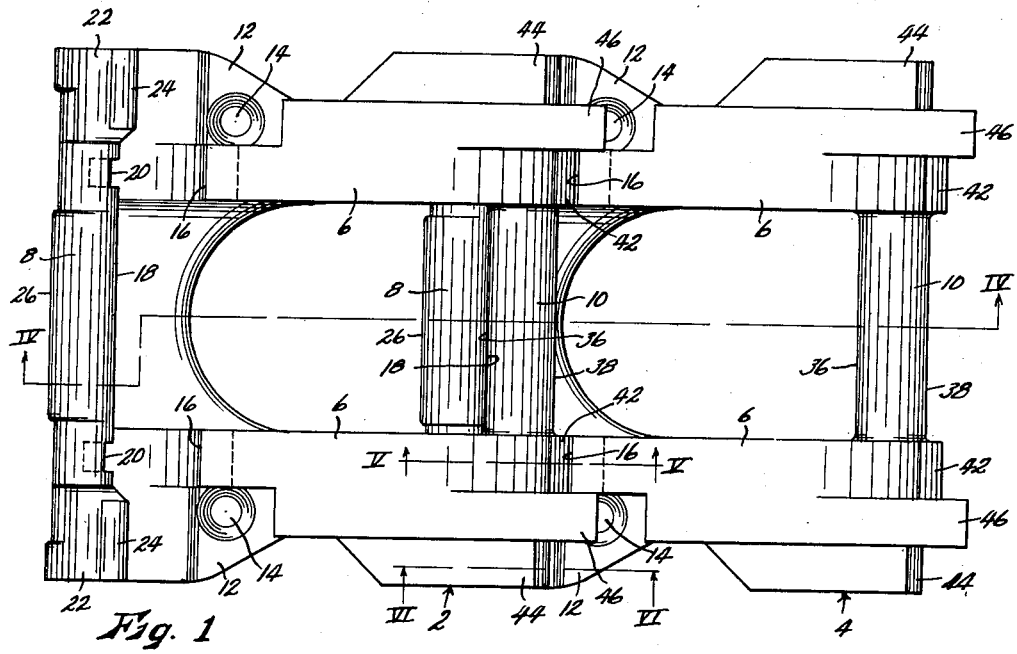
Figure 2:
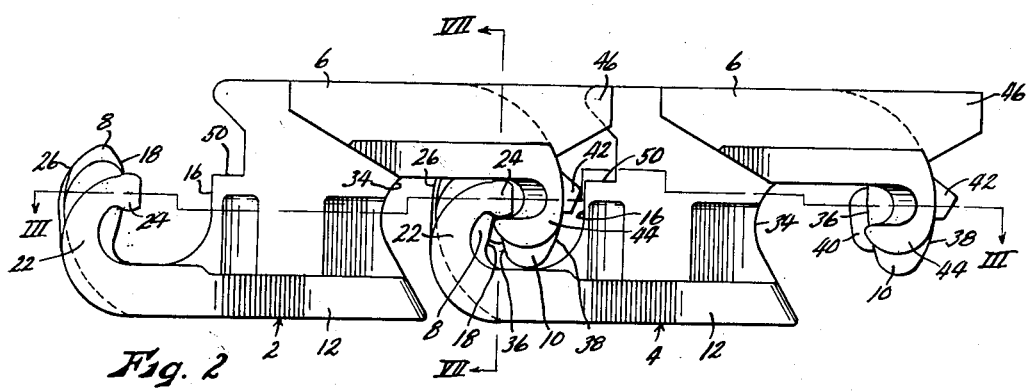

With these objects in view, as well as other objects which will appear in the course of the specification, reference will be had to the accompanying drawing wherein:

FIG. 1 is a top plan view of a pair of tread links each embodying the present invention, operably interengaged with each other, FIG. 2 is a side elevational view of the pair of links as shown in FIG. 1, FIG. 3 is a sectional view taken on line III—III of FIG. 2, FIG. 4 is a sectional view taken on line IV—IV of FIG. 1, showing the links in normal operative position in solid lines, and in position for disengagement in dotted lines, FIGS. 5 and 6 are fragmentary sectional views taken respectively on lines V—V and VI—VI of FIG. 1, FIG. 7 is a sectional view taken on line VII—VII of FIG. 2, and FIG. 8 is a view similar to FIG. 4, but showing a series of links in operative relationship to the drive wheel of a tractor, said drive wheel being shown fragmentarily.

Like reference numerals apply to similar parts throughout the several views, and in FIGS. 1–7, the numerals 2 and 4 apply respectively to a pair of integral, identical tread links, shown operably engaged with each other, and each embodying the present invention. Each of said links is generally rectangular in the plane of the tread, and consists of a pair of generally parallel, spaced apart side rails 6 joined at their ends by cross bars 8 and 10 integral therewith, said cross bars being parallel to each other and disposed at right angles to side rails 6. Side rails 6 are each provided with an outwardly extending flange 12 in which are formed bolt holes 14 to facilitate the attachment thereto of tread wear plates as is common in treads of this character. Said wear plates, however, are not pertinent to the present invention and are not here shown. Flanges 12 are of course disposed at the face of the link remote from the drive and idler wheels of the tractor when a series of the links arranged in an endless chain are trained about said wheels, and this face will hereinafter for convenience be termed the lower face of the link, while the opposite parallel face of the link will be termed its upper face.

Considered transversely to its longitudinal extent, or in cross-section, as best shown in FIG. 4, cross bar 8 extends upwardly from the lower face of the link to form an open hook, being spaced apart from the adjacent end surfaces 16 of side rails 6. The inner face 18 of cross bar 8, being the face thereof facing the remainder of the link, is convexly curved about the longitudinal axis of the cross bar. This curvature extends the full length of the cross bar between side rails 6. Substantially in alignment with each side rail 6, a notch 20 is formed in face 18, said notches being best shown in FIGS. 3, 5 and 7. Cross bar 8 extends to the full width of flanges 12. The end portions thereof, spaced outwardly from notches 20, are curved to form hooks 22 opening toward ends 16 of the side rails, each of said hooks terminating in a cylindrically curved bearing lug 24, the axis of said lugs being parallel to the cross bar and coinciding approximately with inner face 18 thereof, at the line of said face closest to side link surfaces 16. The outer face 26 of cross bar 8, between side rails 6, is also convexly curved about the axis of the cross bar, to adapt it for engagement between the sprocket teeth 28 of a tractor drive wheel 30 as shown in FIG. 8, said wheel being affixed on a power-driven axle 32 of a tractor.

Cross bar 10, considered transversely to its general extent, or in cross-section as viewed in FIG. 4, extends downwardly from the upper face of the link to form an open hook, being spaced apart from the adjacent end surfaces 34 of side rails 6. Inner face 36 of cross bar 10 is convexly curved about the longitudinal axis of the cross bar, in the portion thereof between the side rails, and the outer surface 38 of the cross bar is also convexly curved for engagement with the drive wheel sprocket teeth as indicated in FIG. 8. On inner face 36 substantially in alignment with each side rail 6, is formed an inwardly projecting lug 40. Directly opposite each lug 40, on the outer face 38 of the cross bar, is formed an outwardly projecting stop lug 42. Extending outwardly from each side rail 6, substantially in alignment with cross bar 10, is a hook member 44, said hook opening horizontally toward the opposite end of the link at the same elevation above the lower face of the link as bearing lug 24 at the opposite end of the link. Adjacent cross bar 10, each side rail 6, at the top face of the link, is provided with an extension 46 projecting longitudinally of the tread, thereby forming an extension of the upper face of the link, to an extent sufficient to overlap the side rails 6 of the next adjacent link as shown, for a purpose which will presently be described.

A series of links as described above may be joined in an endless tread loop as best shown in FIGS. 1–7, the cross bar 10 of each link being hooked inside the cross bar 8 of the next adjacent loop, with the respective inner faces 36 and 18 engaging each other in rolling contact about a variable horizontal axis transverse to the tread, as best shown in FIG. 4. In this position, lugs 40 of cross bar 10 engage in notches 20 of cross bar 8, as best shown in FIGS. 3 and 5, whereby to prevent relative movement of the links in a direction parallel to the cross bars. Also, bearing lugs 24 associated with cross bar 8 engage in hooks 44 associated with cross bar 10, as best shown in FIG. 6, whereby to prevent relative movement of the links transversely to the line of contact between the cross bars.

When the tread chain is trained about an idler wheel (not shown) and a drive wheel 30 of a tractor, as indicated in FIG. 8, the chain will have straight reaches extending between the wheels, and curved reaches actually engaging the wheels, wherein the successive links are pivoted relative to each other. That is, successive links are coplanar when in the straight reaches, but move pivotally relative to each other when engaging or disengaging the idler or drive wheels. This pivotal movement of successive links is accommodated by the rolling contact between the mating faces 18 and 36 of the cross bars. This substantially eliminates any friction or rubbing contact between the links, thus greatly reducing wear, and also eliminates any separate hinge pins or pintles which would necessarily have sliding frictional contact with at least one of the links. Furthermore, no lubrication is needed. Any mud, sand, gravel or the like which may be trapped between the lower portions of surfaces 18 and 36 of the cross bars will be ejected when these portions of the surfaces move closer together in the tread operation, through holes 48 (see FIGS. 4 and 7) formed in cross bar 8 at the lower edge thereof.

The cross bars 8 and 10 are retained in proper relation to each other by lugs 24 and 40, as previously described. Furthermore, it will be seen that so long as successive links are coplanar, as in FIG. 4, or relatively pivoted to engage the idler or drive wheels, as in FIG. 8, lugs 42 of cross bar 10 move in close proximity to surfaces 16 of side rails 6. This proximity positively prevents separation of the cross bars to the extent necessary to disengage lugs 24 and 40, and hence prevents any possible accidental separation of the links. However, each surface 16 is notched to provide a horizontal shoulder 50 disposed above the normal level of the associated lug 42. Thus if sufficient slack is introduced into the tread, as by moving the idler and drive wheels relatively closer together, any link of the tread such as link 2 in FIG. 4, may be pivoted relative to the adjacent link, or link 4 in FIG. 4, in a direction opposite to their normal pivotal movement, until lugs 42 are disposed above shoulders 50. The relative position of the two links is indicated in FIG. 4 by the dotted line position of link 2 as compared to link 4. This movement disengages lugs 40 from notches 20, and lugs 24 from hooks 44. Link 2 may then again be pivoted upwardly, but with lugs 42 above shoulders 50, and then lifted upwardly and to the left, as viewed in FIG. 4, to free it from link 4. The links are assembled by reversing this procedure.

The extensions 46 of the side rails 6, by reason of their overlapping relationship with the side rails of the next adjacent link, also provide means for preventing relative movement of the links laterally of the tread, in the same manner as lugs 40. However, the main purpose of these extensions is that they provide that the upper edges of the side rails provide a smooth, unbroken surface along the entire length of the tread, without gaps between the side rails of successive links. The said upper surfaces of these side rails support the weight of the tractor, through a tread flange 52 of drive wheel 30, and a similar flange of the main idler wheel, they also engage smaller idler wheels disposed intermediate the main idler and drive wheels. Particularly as the tread passes over these intermediate idlers, any gap between the side rails of successive links would cause objectionable clattering.

An extremely important feature may be appreciated by examining FIG. 8, wherein are shown a series of links as described, entering upon and trained about drive wheel 30, which may be assumed to be turning in the direction of arrow 54. The links shown are designated successively by the letters A, B, C, D, E and F. It will be seen that the mating cross bars 8 and 10 of each successive pair of links form, in conjunction with each other, a "sprocket pin" projecting between the sprocket teeth 28 of the drive wheel, and whereby the tread is driven. Link A is disposed in a straight reach of the tread, not yet having been engaged by the drive wheel. Link B is still coplanar with link A, but has moved into operative relationship to the drive wheel, outer face 26 of cross bar 8 thereof having just been engaged by a tooth of the drive wheel. Link C is in the same position relative to the wheel as link B, but has pivoted relative to link B. Links D, E and F all have the same relation to each other, and to the wheel, as links B and C. Thus each link, in moving from position B to position C, is stationary relative to the wheel, but pivots relative to the next following link, and frictional rubbing between the parts would necessarily occur except for the special formation of the parts. As already described, friction between the cross bars themselves is prevented by the rolling contact therebetween. Also, it will be seen that outer face 26 of each link, as it passes from position B to position C, has precisely the same angular movement with respect to axle 32 as does the sprocket tooth 28 engaging said face. Thus there is no relative movement between the sprocket teeth 28 and cross bars 8, and another cause of frictional wear is eliminated. The operation is the same if drive wheel 30 is turned in the opposite direction, except that outer faces 38 of cross bars 10 are then engaged operatively by the drive wheel teeth.

While I have shown and described a specific embodiment of my invention, it will be readily apparent that many minor changes of structure and operation could be made without departing from the spirit of the invention as defined by the scope of the appended claims.

What I claim as new and desire to protect by Letters Patent is:

1. A crawler type tractor tread comprising a series of identical unitary links interconnected pivotally to form an endless chain trained about a drive sprocket, each said link being substantially rectangular in the plane of the tread and comprising:
    (a) a pair of spaced apart load-supporting side rails extending in the direction of the tread and adapted to engage a tread flange of said drive sprocket, and
    (b) a pair of cross bars extending at right angles to said side rails respectively at opposite ends thereof, said cross bars constituting hooks extending respectively upwardly from the lower face of the link and downwardly from the upper face of said link, adjacent cross bars of successive links being interengaged to relate said links pivotally, the mating faces of said cross bars being convexly curved about axes longitudinal thereto whereby pivotal movement of said links is accomplished by rolling contact of said convex faces, each mating pair of said cross bars constituting, in conjunction, a sprocket pin adapted to extend between a successive pair of teeth of said drive sprocket, whereby said tread is driven.

2. The structure as defined in claim 1 with the addition of:
    (a) at least one lug extending from the inner face of one of said cross bars and adapted to engage in a corresponding notch formed in the inner face of the mating cross bar of the next adjacent link, whereby to prevent relative movement of said links in a direction parallel to the line of contact between said cross bars, the operative faces of said lugs and said notch being disposed at right angles to the axis of pivotal movement of said links so as not to interfere with said pivotal movement.

3. The structure as defined in claim 1 with the addition of:
    (a) at least one cylindrically curved bearing lug integral with said link carried adjacent the inner face of one of said cross bars with its axis substantially parallel to said cross bar and coinciding with said inner face, and
    (b) a hook member integral with said link carried adjacent the opposite end of said link and opening toward said bearing lug in alignment therewith, whereby said lug engages in the hook member of the next adjacent link to prevent relative movement of said links in a direction parallel to a plane tangent to said mating cross bars at their line of contact, and at right angles to the axes of said cross bars.

4. The structure as recited in claim 3 wherein said bearing lug may be disengaged from said hook members, whereby to permit separation of said links, only by separating the mating surfaces of the cross bars associated therewith, and with the addition of:

(a) a stop lug on the outer face of one of said cross bars and extending outwardly therefrom, said link having a surface thereof confronting the inner face of the other of said cross bars, whereby when said links are interconnected, the stop lug of each link moves at all operative positions of said links in close relation to said confronting surface of the next adjacent link, whereby separation of the mating faces of the associated cross bars is prevented, said confronting surface having a notch formed therein to receive said stop lug, and thereby permit separation of the associated cross bars, only when said links are pivoted relatively to a pre-determined relation in a direction opposite to that in which they pivot as they pass around said drive sprocket.

References Cited in the file of this patent

UNITED STATES PATENTS

| | | |
|---|---|---|
| 1,201,736 | Howe | Oct. 17, 1916 |
| 1,308,308 | Sullivan | July 1, 1919 |
| 2,527,938 | Korra | Oct. 31, 1950 |
| 2,877,060 | Ellison | Mar. 10, 1959 |